Aug. 14, 1962 F. L. PUTZRATH ET AL 3,049,681
HIGH VOLTAGE COUPLING NETWORK
Filed Jan. 18, 1960

INVENTORS
FRANZ L PUTZRATH
ELVET E. MOORE
BY [signature]
ATTORNEY
[signature]
AGENT

United States Patent Office 3,049,681
Patented Aug. 14, 1962

3,049,681
HIGH VOLTAGE COUPLING NETWORK
Franz L. Putzrath, Oaklyn, and Elvet E. Moore, Haddon Heights, N.J., assignors to the United States of America as represented by the Secretary of the Air Force
Filed Jan. 18, 1960, Ser. No. 3,209
2 Claims. (Cl. 333—24)

Figure 1:
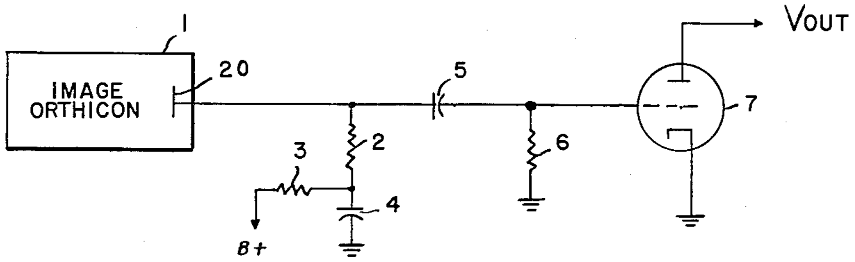
Fig-1 PRIOR ART

The invention relates to an improvement in means for coupling an alternating current signal from a point of high potential to a point of low potential. The improvement reduces the required physical size and weight of the coupling capacitor used to couple an image orthicon camera tube with the preamplifier stages by the addition to the coupling circuit in series with the capacitor of one or more Zener diodes in series with a resistor connected to a point of reference potential and an impedance stabilizing condenser in shunt with each Zener diode.

Restrictions caused by the physically large capacitors used in present day vacuum tube preamplifiers for image orthicons have not been considered too objectionable since the equipment size is fairly large and bulky so the addition of a large capacitor has not added materially to the equipment size and weight. If, however, it is desired to build small compact television camera equipment useful, for example, in reconnaissance, weapons guidance and instrumentation applications the weight and size of the coupling capacitor becomes more critical. Ideally, the image orthicon television camera should be no larger than the image orthicon portion itself. Upon transistorizing the image orthicon camera, the coupling capacitor due to practical design limitations must be made roughly twice the value that can be used in the corresponding tube amplifier, thereby requiring a coupling capacitor of a physical size and weight almost that of the amplifier itself.

It is the object of this invention to reduce the size and weight of certain components associated with transistorized image orthicon television cameras.

It is the specific object of this invention to overcome the necessity of using coupling or blocking capacitors of a physically large size in an image orthicon tube to a transistor preamplifier coupling circuit without adversely affecting the quality of signal received at the transistor preamplifier input.

The nature of the invention, further objects and advantages will appear more fully on consideration of the embodiments illustrated in the accompanying drawings and hereinafter to be described.

Figure 2:
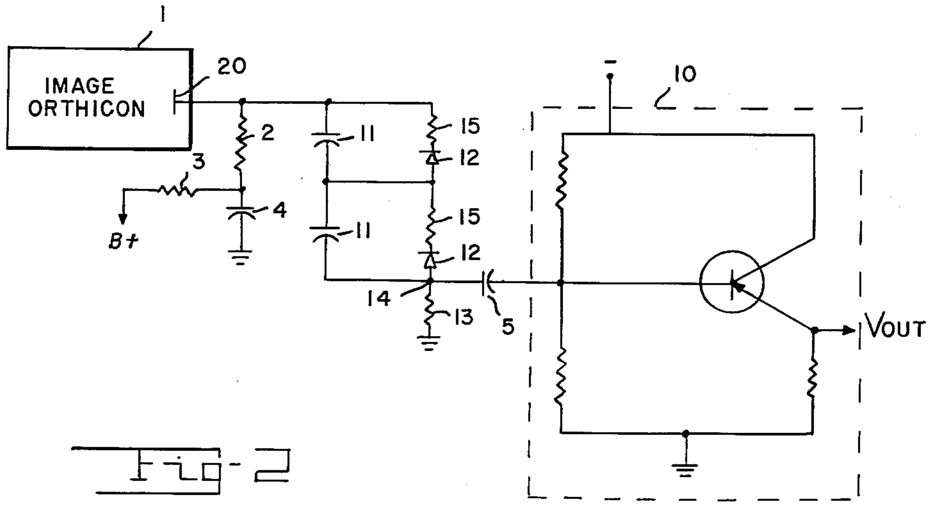

In the drawings:

FIG. 1 is a schematic diagram indicating a prior art scheme of how an image orthicon camera tube is coupled into a vacuum tube preamplifier; and FIG. 2 is a schematic diagram illustrating the novel coupling device for coupling an image orthicon camera tube into a transistor preamplifier stage.

Referring now more particularly to FIG. 1, there is illustrated the present day image orthicon to vacuum tube preamplifier coupling means. The image orthicon camera tube 1 has the last dynode 20 of its electron multiplier, which is the signal output electrode, connected to one end of the load resistor 2 the other end of which is connected to voltage source B+. The normal B+ voltage is in the range of 1000 to 1500 volts, for most image orthicon tubes. Resistor 3 and capacitor 4 form a filter for the D.C. voltage. Coupling or blocking capacitor 5 couples the video signals into the grid of amplifier tube 7. Resistor 6 is the grid return resistor of amplifier 7.

Certain considerations must be taken into account in the choice of coupling capacitor 5. First, it must have a high breakdown voltage rating, i.e. 1500 to 2000 volts D.C. This means it will be quite large physically unless, its capacitive value is relatively small. The range of frequencies in the video signal from the camera tube 1 are from quite low to quite high frequencies, i.e. 5–10 c.p.s. to 4–8 m.c.p.s. Hence, to satisfy the low frequency coupling requirement, the reactance of the capacitor must equal the sum of the resistors 2 and 6 at the low frequency where the response may drop 3 decibels. Resistor 2 must be kept at a fairly low value, so that stray capacities from the last dynode 20 of the camera tube 1 to ground will be somewhat "swamped out." Also, the value of the grid resistor 6 can be no larger than approximately 1 megohm, in order to satisfy the tube manufacturer's requirements. Therefore, from a low frequency standpoint, the capacitive value of the coupling or blocking capacitor 5 must be at least from 0.01 to 0.1 mf. A physically large capacitor is thereby required in the circuit of FIG. 1, and due to the capacitor's size a high capacity to ground results tending to limit the high frequency response.

These restrictions caused by the physically large capacitor have not been considered too objectionable in present day vacuum tube preamplifiers for image orthicons, since the equipment size is fairly large and bulky so that the addition of a large capacitor has not added materially to the equipment size and weight.

The substitution of a transistor preamplifier for the amplifier tube 7 of FIG. 1 would be an obvious step in an effort to reduce the size and weight of present day image orthicon television camera equipment. However, because of the relative magnitudes of the impedances in the transistor amplifier, certain values of circuit components must be changed in order to get the previously mentioned bandwidth. The input impedance of the transistor amplifier is quite low, i.e. ranging anywhere from 1000 to 5000 ohms depending on the circuit configuration, so it will by itself "swamp out" somewhat the effect of stray capacities and input and output capacities associated with the amplifier and image orthicon tube respectively. From a low frequency standpoint, resistor 2 must now be made as large as possible, in order that the capacitive value of coupling capacitor 5 is as low as possible, to cut down its physical size. Practical limitations on the operation of the camera tube place a top limit of 0.5 megohm on this resistor. Thus the capacitive value of coupling capacitor 5 must be roughly twice that used in the corresponding tube amplifier and correspondingly the capacitor's physical size will be somewhat larger.

Now, the objections placed on this capacitor become stronger. For if it is desired to build small compact equipment, no larger ideally than the image orthicon portion itself, the objection is present that the coupling capacitor is as big as most of the amplifier.

There are certain alternatives available to those skilled in the art for reducing the size of the coupling capacitor. One might be able to apply a source of negative high voltage to the cathode of the image orthicon tube. Thus, its anode load could be connected to ground and there would no longer be the need for a high voltage coupling capacitor. This would also be desirable in the vacuum tube amplifier version also. Unfortunately, however, signals now being coupled into the anodes of the image orthicon tube by means of low voltage capacitors, would now require high voltage capacitors, so the net reduction in size and weight of the camera system would be negligible. Another possibility is to adjust the values of capacitor 4 and resistor 3 so as to give a "low frequency boost." The adjustment of capacitor 4 to a lower value is limited, however, by its value required for effective filtering action.

FIG. 2 shows the novel device that alleviates this problem and does it using a minimum of components and complexity. The dynode 20 of the image orthicon camera tube 1 is, as in FIG. 1, connected through resistors 2 and 3 to a source of high voltage B+. The last dynode 20 of the electron multivibrator in the image orthicon camera tube 1 is also connected to the transistor amplifier 10 through one or more Zener diodes 12 in series with reverse current limiting resistor 13 and through the coupling capacitor 5.

The resistor 13 is used to limit the reverse current to some value below the knee of the diode's characteristic in the Zener breakdown region, e.g. 50 to 100 microamps. The value of this resistor 13 is about 5 megohms, so its presence does not materially change the circuit. A capacitor 11 and a resistor 15 are used in conjunction with each Zener diode 12 to stabilize the A.C. dynamic impedance over the useful bandpass which Zener diodes exhibit and to bypass any semiconductor noise generated in the diodes. The capacitor 11 is applied in parallel and the resistor 15 in series with each Zener diode 12.

The Zener diode is a p-n junction biased in the reverse direction and to a voltage high enough for appreciable current to flow due to what is called Zener breakdown. The physical phenomenon is essentially that of internal field emission across the forbidden gap. These diodes exhibit Zener breakdowns at high values of back voltage. Therefore, if the particular diodes used breakdown at approximately 500 volts, the potential of point 14 will be less than the B+ value by 1000 volts. The diodes exhibit an A.C. dynamic impedance in the breakdown region of approximately 1000 to 20,000 ohms.

The novel high voltage coupling device is physically small in size and weight. The capacitors 11 may be, for example, "postage stamp" micas. The coupling capacitor 5 in the novel device needs only to have a 200 to 500 volt D.C. rating, and may be, therefore, materially smaller in physical size. The Zener diodes 12 are the same size as transistors. If the B+ voltage is relatively low, only one diode need be used.

The invention is not limited to the examples of embodiments shown and described, but may on the contrary, be capable of many modifications. For example, in applications employing different B-plus magnitudes, other diodes having different Zener breakdowns may be employed.

We claim:

1. A circuit for coupling an alternating current signal from a point of high direct potential to a point of low direct potential as measured relative to a point of reference potential, said circuit comprising: a direct current potential divider comprising a two-terminal network and a resistor connected in series in the order named between said high potential point and said point of low potential, said network consisting of a Zener diode and a filter resistor connected in series between the network terminals and a small filter and impedance stabilizing capacitor connected between said terminals and in shunt to said series-connected diode and filter resistor, and a blocking capacitor connected between said low potential point and a point in said potential divider between said network and the first-mentioned resistor, said diode being poled for conduction in the reverse direction and said first-mentioned resistor having such value that the potential drop across said diode exceeds the Zener breakdown voltage, whereby said diode has a relatively low impedance to said signal.

2. A network for coupling an alternating current signal from a point of high direct potential to a point of low direct potential as measured relative to a point of reference potential, said network comprising: a direct current potential divider comprising a plurality of Zener diodes and a resistor connected in series in the order named between said high potential point and said point of reference potential, and a blocking capacitor connected between said low potential point and a point in said potential divider between said plurality of diodes and said resistor, each of said diodes being poled for conduction in the reverse direction and said resistor having such value that the potential drop across each of said diodes exceeds the Zener breakdown voltage, whereby each of said diodes has a relatively low impedance to said signal.

References Cited in the file of this patent

UNITED STATES PATENTS

| | | |
|---|---|---|
| 2,714,702 | Shockley | Aug. 2, 1955 |
| 2,879,412 | Hoge | Mar. 24, 1959 |
| 2,892,103 | Scarbrough | June 23, 1959 |
| 2,906,941 | Brolin | Sept. 29, 1959 |
| 2,933,692 | Meyers | Apr. 19, 1960 |
| 2,954,483 | Ulrich | Sept. 27, 1960 |